United States Patent
Ganapathy

(10) Patent No.: US 9,730,118 B2
(45) Date of Patent: Aug. 8, 2017

(54) COMMUNICATION SYSTEM

(75) Inventor: Suresh Ganapathy, Tokyo (JP)

(73) Assignee: NEC CORPORATION, Tokyo (JP)

( * ) Notice: Subject to any disclaimer, the term of this patent is extended or adjusted under 35 U.S.C. 154(b) by 382 days.

(21) Appl. No.: 13/390,594

(22) PCT Filed: Aug. 10, 2010

(86) PCT No.: PCT/JP2010/063795
§ 371 (c)(1),
(2), (4) Date: Feb. 15, 2012

(87) PCT Pub. No.: WO2011/021596
PCT Pub. Date: Feb. 24, 2011

(65) Prior Publication Data
US 2012/0147852 A1    Jun. 14, 2012

(30) Foreign Application Priority Data
Aug. 18, 2009    (GB) .................................. 0914427.0

(51) Int. Cl.
*H04W 4/00*      (2009.01)
*H04W 36/00*    (2009.01)
*H04W 84/04*    (2009.01)

(52) U.S. Cl.
CPC ...... *H04W 36/0055* (2013.01); *H04W 84/045* (2013.01)

(58) Field of Classification Search
USPC ........ 370/331, 353, 354, 338, 329; 455/436, 455/439, 442, 33.2, 422.1
See application file for complete search history.

(56) References Cited

U.S. PATENT DOCUMENTS

| 8,638,718 | B2 | 1/2014 | Hosono |
| 2003/0194997 | A1* | 10/2003 | Huomo .................. 455/432.1 |
| 2005/0111410 | A1 | 5/2005 | Bazar |
| 2007/0036109 | A1* | 2/2007 | Kwak et al. .............. 370/331 |
| 2007/0060133 | A1 | 3/2007 | Spitzer et al. |
| 2010/0041405 | A1* | 2/2010 | Gallagher et al. ............ 455/436 |

(Continued)

FOREIGN PATENT DOCUMENTS

| EP | WP 1 341 342 A1 | 9/2003 |
| JP | 2002-077462 A | 3/2002 |

(Continued)

OTHER PUBLICATIONS

"Traffic Volume Report":3GPP TSG-RAN WG2 Me&ting #57;Feb. 12-16, 2007.*

(Continued)

*Primary Examiner* — Zewdu A Beyen
(74) *Attorney, Agent, or Firm* — Sughrue Mion, PLLC

(57) ABSTRACT

A communication system is described in which mobile telephones are able to roam between neighboring home node base stations and in which the home base stations or the home base station gateway devices are arranged to aggregate "Unsuccessfully Transmitted DL Data Volume" determined by previous home base stations served by the gateway device. In this way, when a call is transferred away from the gateway device or is released, a total aggregated value of "Unsuccessfully Transmitted DL Data Volume" can be provided to the core network for billing purposes.

2 Claims, 3 Drawing Sheets

(56) References Cited

U.S. PATENT DOCUMENTS

2010/0120430 A1     5/2010    Hayashi
2010/0296457 A1    11/2010    Hosono

FOREIGN PATENT DOCUMENTS

| JP | 2005-64961 A | 3/2005 | | |
|----|----|----|----|----|
| JP | 2008-547353 A | 12/2008 | | |
| JP | EP 2139258 A1 * | 12/2009 | ............. | H04L 12/14 |
| WO | WO 2008/123140 A1 | 10/2008 | | |
| WO | WO 2009/093733 A1 | 7/2009 | | |
| WO | WO 2010075892 A1 * | 7/2010 | | |

OTHER PUBLICATIONS

"Data Volume Report function in SAEILTE":3GPP TSG RAN WG3 Meeting #56;Kobe. Japan. May 7-11, 2007.*
International Search Report in PCT/JP2010/063795 dated Nov. 15, 2010 (English Translation Thereof).
NEC "Data Volume Reporting in Intra HNB-GW Mobility" 3GPP Draft; R3-092028, $3^{rd}$ Generation Partnership Project (3GPP), Mobile Competence Centre; 650, Route des Lucioles; F-06921 Sophia-Antipolis Cedex; France; No. Shenzhen, China; Aug. 24, 2009, 204Aug. 2009(Aug. 24, 2009), XP050391586 [retrieved on Aug. 31, 2009].
3GPP TS 25.413, V8.3.0. (Jun. 2009),Technical Specification, $3^{rd}$ Generation Partnership Project; Techincal Specification Group Radio Access Network; UTRAN Iu interface Radio Access Network Application Part (RANAP) signalling (Release 8).
3GPP TS 25.469, V8.2.0. (Jun. 2009),Technical Specification, $3^{rd}$ Generation Partnership Project; Techincal Specification Group Radio Access Network; UTRAN Iu interface Home Node B Application Part (HNBAP) signalling (Release 8).
3GPP TS 25.468, V8.1.0. (Mar. 2009),Technical Specification, $3^{rd}$ Generation Partnership Project; Techincal Specification Group Radio Access Network; UTRAN Iuh interface RANAP User Adaptation (RUA) signalling (Release 8).
3GPP TS 22.220, V9.1.1. (Jun. 2009),Technical Specification, $3^{rd}$ Generation Partnership Project; Techincal Specification Group Services and System Aspects; Service requirements for Home NodeBs and Home eNodeBs (Release 9).
Japanese Office Action dated Feb. 12, 2014, with English translation.
Nokia Siemens Networks, Nokia Active Mode Mobility for Intra HNB GW Handover, 3GPP TSG RAN WG3 Meeting #64, R3-091362, May 8, 2009.
Japanese Office Action dated Jul. 1, 2015 with partial English Translation.
Japanese Office Action dated Sep. 16, 2015 with an English translation thereof.

* cited by examiner

COMMUNICATION SYSTEM

TECHNICAL FIELD

The present invention relates to mobile telecommunication networks, particularly but not exclusively networks operating according to the 3GPP (3$^{rd}$ Generation Partnership Project) standards or equivalents or derivatives thereof. The invention has particular although not exclusive relevance to the reporting of an unsuccessful packet transmission count at the end of a call.

BACKGROUND ART

Under the 3GPP standards, a NodeB (or an eNB in LTE) is the base station via which mobile devices connect to the core network. Recently the 3GPP standards body has adopted an official architecture and started work on a new standard for home base stations (HNB). Where the home base station is operating in accordance with the (Long Term Evolution) LTE standards, the HNB is sometimes referred to as a HeNB. A similar architecture will also be applied in the WiMAX network. In this case, the home base station is commonly referred to as a femto cell. For simplicity, the present application will use the term HNB to refer to any such home base station and will use the term base station generically to refer to other base stations (such as the base station for the macro cell in which a HNB operates). One or more HNBs will provide radio coverage (for example, 3G/4G/WiMAX) within the home and will connect to the core network via one or more suitable public networks (for example via an ADSL link to the Internet) and in the case of the 3GPP standards, via an HNB gateway (HNB-GW) which will aggregate traffic from the one or more HNBs.

The current specification for the 3GPP standards require the Information Element (IE) "Unsuccessfully Transmitted DL Data Volume" to be reported when a call is finally released as the charging policy may depend on the successful packet count. The serving base station keeps a count of the unsuccessful DL data packets so that this can be reported when the call is released. However, as the User Equipment (UE), such as a mobile telephone, moves around with the user, it is likely that during the call, the UE will roam between cells. When roaming between macro cells, the Iu connection between the source base station and the core network will be released and a new Iu connection established by with the target base station. The core network can therefore aggregate the unsuccessful packet counts for each of the base stations involved in the call. However, the inventor has realised that when a UE moves from one HNB to another HNB, the Iu connection between the HNB-GW and the Core Network will not be released during the handover and so the core network will not be able to keep track of the unsuccessful packet count.

The present invention has been made to address this problem. The inventor has realised that this problem can be addressed by making the HNB-GW or at the HNB(s) involved in the handover responsible for aggregating the unsuccessful DL data packets, so that when the call is finally released, the total aggregated count of unsuccessful DL packets is reported to the core network.

DISCLOSURE OF THE INVENTION

According to one aspect, the present invention provides a gateway device for connection in a communication network, the gateway device being operable to control service to a plurality of home base stations and to control handover of a mobile communications between at least two of those base stations, wherein the gateway device is operable to aggregate the number of unsuccessfully transmitted downlink data packets for a mobile communications device and to report the aggregated number to a core network node when a connection for the mobile communications device between the core network and the gateway device is released.

In one embodiment, at the time of handover of the mobile communications device from a source home base station to a target home base station, the source base station reports data relating to the number of unsuccessfully transmitted downlink data packets that the source home base station sent to the mobile communications device and wherein the gateway device is operable to sum the number with similar numbers obtained at other handovers and from the final home base station prior to the time of releasing the connection with the core network.

The gateway device may receive data relating to the number of unsuccessfully transmitted downlink data packets that the source home base station sent to the mobile communications device in an RANAP IU RELEASE COMPLETE message sent by the source home base station.

Alternatively, the gateway device may receive the data relating to the number of unsuccessfully transmitted downlink data packets that the source home base station sent to the mobile communications device in an RUA DISCONNECT message sent by the source home base station. In this case, at the time of handover, the gateway device may send the source home base station an RUA DISCONNECT message and the data relating to the number of unsuccessfully transmitted downlink data packets that the source home base station sent to the mobile communications device may be sent by the source home base station to the gateway device in an RUA DISCONNECT RESP message.

Alternatively, the gateway device may receive the data relating to the number of unsuccessfully transmitted downlink data packets that the source home base station sent to the mobile communications device in an HNBAP UE DE-REGISTER message sent by the source home base station. In this case, at the time of handover, the gateway device may send the source home base station a HNBAP UE DE-REGISTER message and the data relating to the number of unsuccessfully transmitted downlink data packets that the source home base station sent to the mobile communications device may be sent by the source home base station to the gateway device in an HNBAP UE DE-REGISTER RESPONSE message.

The present invention also provides a gateway device for connection in a communication network, the gateway device comprising: a first interface to couple the gateway device with a core network; a second interface for coupling with a plurality of home base stations over a public network; a connection controller operable to establish and to release a connection for a mobile communications device over said first interface between the gateway device and the core network; a handover module operable to handover a mobile communications device from a source home base station coupled with the gateway device to a target home base station coupled with the gateway device; an unsuccessful packet control module operable: i) to receive data from a plurality of home base stations representing the number of unsuccessfully transmitted downlink data packets sent by the home base station to the mobile communications device; ii) to sum the number of unsuccessfully transmitted downlink data packets sent by home base stations to the communications device; and iii) to report the cumulative number of unsuccessfully transmitted downlink data packets sent by home base stations to the communications device at the time that said connection is released by said connection controller.

The present invention also provides a home base station for connection to a gateway device and for providing communication service to one or more mobile communications devices, the home base station comprising: a downlink unsuccessful packet control module operable to maintain a count of the number of downlink packets unsuccessfully transmitted by the home base station to a mobile communications device; and a handover module operable to control handover of a mobile communications device to a target home base station; wherein the handover module is operable to provide the target home base station, at the time of handover, with data indicating the number of downlink packets unsuccessfully transmitted by the home base station to the mobile communications device.

In one embodiment the handover module controls handover of a mobile communications device to the home base station from another home base station and during the handover receives data indicating the number of downlink packets unsuccessfully transmitted by the other home base stations to the mobile communications device and wherein the downlink unsuccessful packet control module aggregates the number of unsuccessfully transmitted downlink packets that the home base station transmits to the mobile communications device with the number of unsuccessfully transmitted downlink packets that the other home base stations transmitted to the same mobile communications device.

The present invention also provides a home base station for connection to a gateway device and for providing communication service to one or more mobile communications devices, the home base station comprising a downlink unsuccessful packet control module that aggregates the number of downlink data packets unsuccessfully transmitted by one or more previous home base stations to a mobile communications device with the number of downlink data packets unsuccessfully transmitted by the home base station to the same mobile communications device.

The present invention also provides a method performed by a gateway device that controls service to a plurality of home base stations and that controls handover of a mobile communications device between those base stations, wherein the method further comprises aggregating the number of unsuccessfully transmitted downlink data packets for a mobile communications device and reporting the aggregated number to a core network node when a connection for the mobile communications device between the core network and the gateway device is released.

The present invention also provides a method performed by a home base station that connects with a gateway device and that provides communication service to one or more mobile communications devices, the method comprising: maintaining a count of the number of downlink packets unsuccessfully transmitted by the home base station to a mobile communications device; and handing over the mobile communications device to a target home base station; wherein handing over includes providing the target home base station with data indicating the number of downlink packets unsuccessfully transmitted by the home base station to the mobile communications device.

Although for efficiency of understanding for those of skill in the art, the invention will be described in detail in the context of a 3G system, the principles of the invention can be applied to other systems (such as WiMAX) in which mobile devices or User Equipment (UE) communicate with one of several base stations with the corresponding elements of the system changed as required.

The invention also provides, for all methods disclosed, corresponding computer programs or computer program products for execution on corresponding user communications devices or network communications devices. The invention also provides user communications devices and network communications devices configured or operable to implement the methods and components thereof) and methods of updating these.

Embodiments of the invention will now be described, by way of example, with reference to the accompanying drawings in which:

BEST MODE FOR CARRYING OUT THE INVENTION

With reference to the drawings in general, it should be understood that any functional block diagrams are intended simply to show the functionality that exists within the device and should not be taken to imply that each block shown in the functional block diagram is necessarily a discrete or separate entity. The functionality provided by a block may be discrete or may be dispersed throughout the device or throughout a part of the device. In addition, the functionality may incorporate, where appropriate, hardwired elements, software elements or firmware elements or any combination of these.

OVERVIEW

Figure 1:
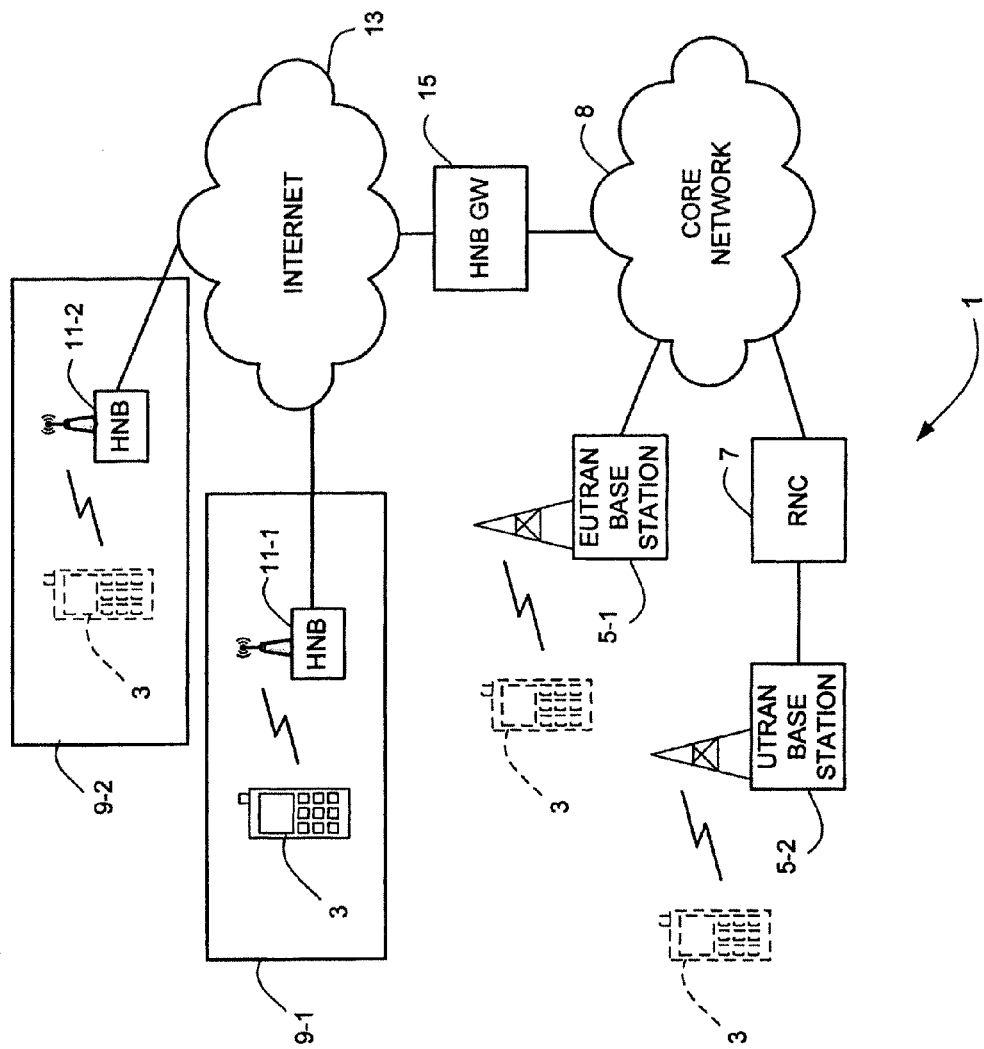
FIG. 1 schematically illustrates a mobile telecommunication system of a type to which the embodiment is applicable.

FIG. 1 schematically illustrates a mobile (cellular) telecommunication system 1 in which a user of a mobile telephone (MT) 3 can communicate with other users (not shown) via a macro cell of an E-UTRAN base station 5-1 or a UTRAN base station 5-1 and Radio Network Controller (RNC) 7 and a core network (CN) 8 when the user is away from a 'home' base station (HNB) based cell 9-1. In the telecommunication system 1 the user may also communicate with the other users (not shown) via the cell 9-1 of an HNB 11-1, a public data network (in this case the Internet 13), a home base station gateway (HNB-GW) 15, and the core telephone network 8 when the user is within the HNB based cell 9-1. The HNB 11-1 will typically connect to the respective HNB-GW 15 via a suitable Internet connection such as an ADSL or cable connection and is programmed with the IP address of the HNB-GW 15 so that all uplink communications are transmitted via the respective HNB-GW 15. A second HNB illustrated having its own cell 9-2 and the mobile telephone 3 is able to roam from one HNB 11 to the other, depending on which one provides the best connection.

As will be described in more detail below, in this embodiment, the HNB-GW 15 or the HNB(s) involved in a handover between HNBs aggregate the count of unsuccessful DL packet transmissions. When the HNB-GW 15 aggregates the unsuccessful DL packet transmission counts, it has to get the "Unsuccessfully Transmitted DL Data Volume" from the source HNB 11 and aggregate these values each time the mobile telephone 3 relocates to a different HNB 11 within the HNB-GW 15. When the HNB(s) 11 aggregate the unsuccessful DL packet counts, at the time of Inter HNB handover, the source HNB has to signal its (aggregated) count to the target HNB so that it can continue to aggregate the count and send the aggregated "Unsuccessfully Transmitted DL Data Volume" to the core network 8 when the IU connection between the core network 8 and the HNB-GW 15 is released.

HNB-GW Based Solution:

As discussed above, there are two different solutions to the problem addressed by the present invention and the first solution requires the HNB-GW 15 to aggregate the "Unsuccessfully Transmitted DL Data Volume" from the source HNB 11 each time the mobile telephone 3 relocates to a different HNB 11 within the HNB-GW 15. There are a number of different ways that the HNB-GW 15 can obtain the "Unsuccessfully Transmitted DL Data Volume" from the source HNB 11 and some of these are described below.

Alternative 1a: HNB-GW 15 sends a RANAP IU RELEASE COMMAND message to the source HNB 11 and the Source HNB 11 responds with a RANAP IU RELEASE COMPLETE message that includes the IE "Unsuccessfully Transmitted DL Data Volume".

Alternative 1b: the source HNB 11 could include "Unsuccessfully Transmitted DL Data Volume" in the RUA DISCONNECT message to the HNB-GW 15. The source HNB 11 would send this message to the HNB-GW when it detects that the relocation is successful.

Alternative 1c: the source HNB 11 could include "Unsuccessfully Transmitted DL Data Volume" in the HNBAP UE DEREGISTER message to the HNB-GW 15. Again, source HNB 11 would send this message to the HNB-GW when it detects that the relocation is successful.

Alternative 1d: HNB-GW 15 can send the source HNB 11 an RUA DISCONNECT message with relevant cause such as "UE relocated"; and the source HNB 11 can reply with a new RUA message RUA DISCONNECT RESP, which includes "Unsuccessfully Transmitted DL Data Volume".

Alternative 1e: HNB-GW IS can send the source HNB 11 an HNBAP UE DE-REGISTER message and the source HNB 11 can reply with an HNBAP UE DE-REGISTER RESPONSE, which includes "Unsuccessfully Transmitted DL Data Volume".

After reception of "Unsuccessfully Transmitted DL Data Volume" from the source HNB 11, based on one of the above alternatives, the HNB-GW 15 shall remember (store) this value and shall add each "Unsuccessfully Transmitted DL Data Volume" reported by HNBs during relocation procedures and finally use this aggregated value to send "Unsuccessfully Transmitted DL Data Volume" IE in the actual IU RELEASE COMPLETE message to the core network 8.

For details of the RUA messages, the reader is referred to 3GPP standards document TS 25.468—UTRAN Iuh Interface RANAP User Adaption (RUA) signalling; for HNBAP messages to 3GPP standards document TS 25.469—UTRAN Iuh interface Home Node B Application Part (HNBAP) signalling; and for RANAP messages to 3GPP standards document TS 25.413—UTRAN Iu interface Radio Access Network Application Part (RANAP) signalling.

HNB Based Solution

The second solution to the problem addressed is for the source HNB 11 to signal its aggregated "Unsuccessfully Transmitted DL Data Volume" to the target HNB 11 at the time of handover, so that the target HNB 15 can continue the aggregated count and so that the final target HNB 11 can report the aggregated "Unsuccessfully Transmitted DL Data Volume" to the core network 8 when the call is finally released or transferred to a macro cell or another HNB controlled by a different HNB-GW. The source HNB 11 can signal its aggregated "Unsuccessfully Transmitted DL Data Volume" to the target HNB 11 in the SRNC to TRNC Container.

Home Base Station

Figure 2:
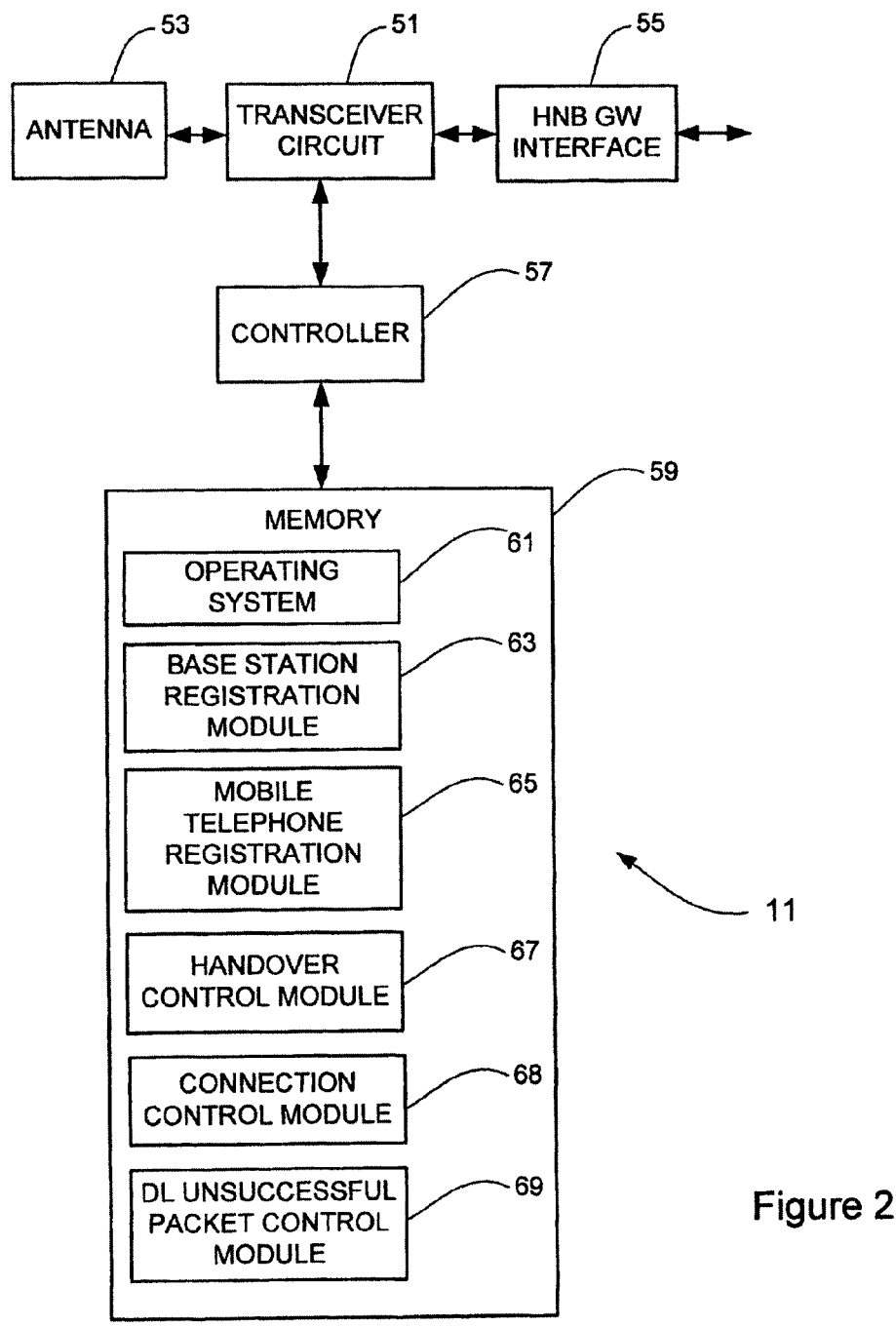
FIG. 2 is a block diagram of a home base station forming part of the system shown in FIG. 1.

FIG. 2 is a block diagram illustrating the main components of each of the home base stations (HNBs) 11 shown in FIG. 1. As shown, each HNB 11 includes transceiver circuitry 51 which is operable to transmit signals to, and to receive signals from, the mobile telephone 3 via one or more antennae 53 and which is operable to transmit signals to and to receive signals from the HNB-GW 15 via an HNB-GW interface 55. The operation of the transceiver circuitry 51 is controlled by a controller 57 in accordance with software stored in memory 59. Although not necessarily shown in FIG. 2, the home base station 11 will of course have all the usual functionality of a cellular telephone network home base station and this may be provided by any one or any combination of hardware, software and firmware, as appropriate. Software may be pre-installed in the memory 59 and/or may be downloaded via the telecommunications network 8 or from a removable data storage device.

The controller 57 is configured to control overall operation of the home base station 11 by, in this example, program instructions or software instructions stored within memory 59. As shown, these software instructions include, among other things, an operating system 61, a base station registration module 63, a mobile telephone registration module 65, a handover module 67, a connection control module 68 and a DL unsuccessful packet control module 69. The base station registration module 63 is operable to register the HNB 11 with the HNB-GW 15 and the telephone registration module 65 is operable to register the mobile telephone 3 with the HNB 11 and with the HNB-GW 15. The handover module 67 is operable to control handover of a mobile telephone 3 from the HNB 11 to another HNB or to another base station 5. The connection control module 68 is operable to control connections between the HNB 11 and the mobile telephones 3 it is serving and the connection with the HNB-GW 15. The DL unsuccessful packet control module 69 is operable to keep a count of the DL packets that are unsuccessfully transmitted to a mobile telephone 3 and to provide that count either to the HNB-GW 15 or to the target HNB at the time of Intra HNB handover or to the core network 8 at the time of handover to a macro cell or to another HNB 11 that is served by a different HNB-GW 15. If the HNBs 11 are responsible for aggregating the "Unsuccessfully Transmitted DL Data Volume", then at the time of Intra HNB handover, the DL unsuccessful packet control module 68 in the target HNB 11 will receive the "Unsuccessfully Transmitted DL Data Volume" from the source HNB 11 and will sum it together with its own calculated "Unsuccessfully Transmitted DL Data Volume", before signalling the aggregated value to the next target HNB 11 or to the core network 8.

Home Base Station Gateway

Figure 3:
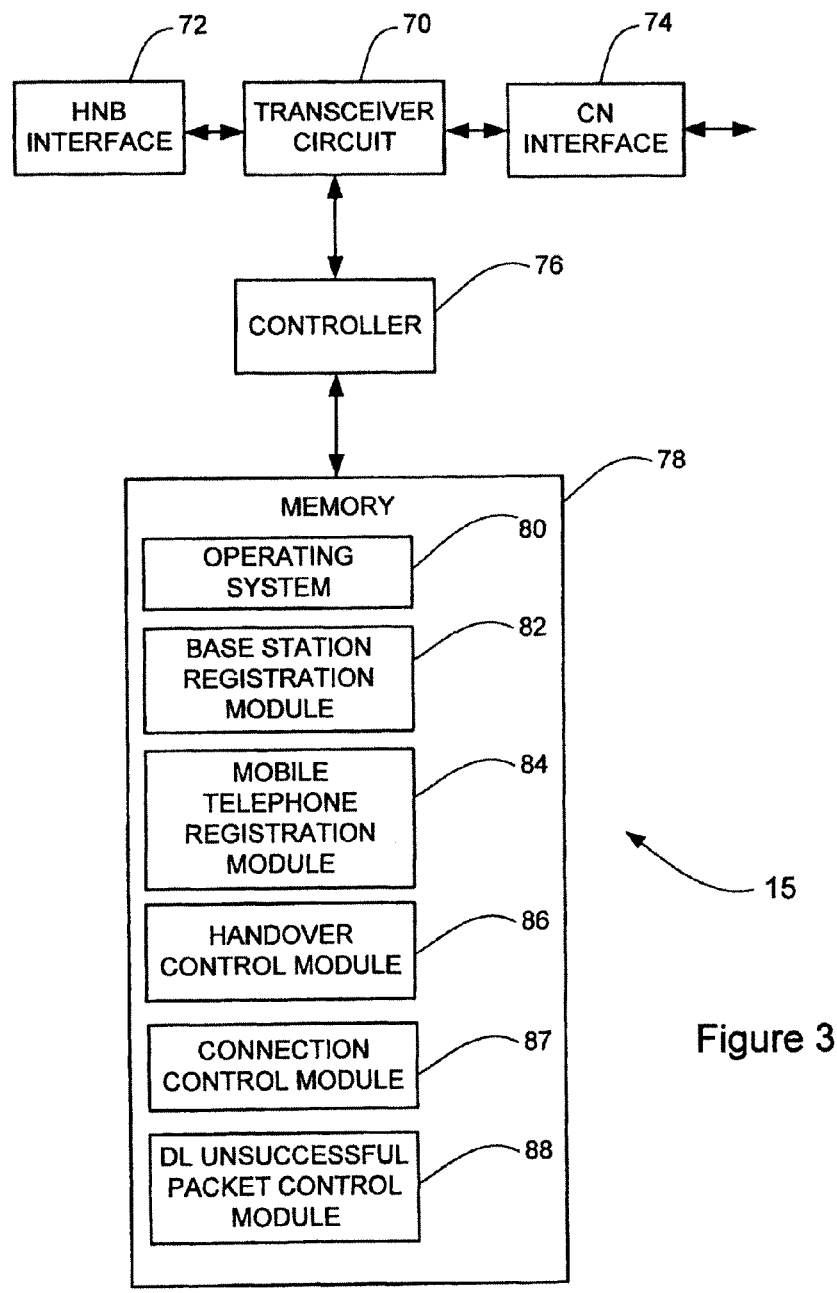
FIG. 3 is a block diagram of a home base station gateway forming part of the system shown in FIG. 1.

FIG. 3 is a block diagram illustrating the main components of the home base station gateway (HNB-GW) 15 shown in FIG. 1. As shown, the HNB-GW 15 includes transceiver circuitry 70 which is operable to transmit signals to and to receive signals from, the HNB 11 via an HNB interface 72 and which is operable to transmit signals to, and to receive signals from, the CN 8 via a CN interface 74. The operation of the transceiver circuitry 70 is controlled by a controller 76 in accordance with software stored in memory 78. Although not necessarily shown in FIG. 3, the HNB-GW 15 will of course have all the usual functionality of a cellular telephone HNB-GW and this may be provided by any one or any combination of hardware, software and firmware, as appropriate. Software may be pre-installed in the memory 78 and/or may be downloaded via the telecommunications network 8 or from a removable data storage device.

The controller 76 is configured to control overall operation of the home base station 11 by, in this example, program instructions or software instructions stored within memory 78. As shown, the software includes, among other things, an operating system 80, a base station registration module 82, a mobile telephone registration module 84, a handover module 86, a connection control module 87 and a DL unsuccessful packet control module 88.

The base station registration module 82 is operable to register the HNB 11 with the HNB-GW 15 and the telephone registration module 65 is operable to register the mobile telephone 3 with the HNB-GW IS. The handover control module 86 is operable to control Intra HNB handover of a mobile telephone 3 between two HNBs 11 that are served by the HNB-GW 15. The connection control module 87 is operable to establish a connection for a mobile telephone between the HNB-GW 15 and the core network (through the CN interface 74) and to establish a connection between the HNB-GW 15 and the serving HNB 11. The DL unsuccessful packet control module 88 is operable to obtain the "Unsuccessfully Transmitted DL Data Volume" from the source HNB 11 and aggregate (sum) these values each time the mobile telephone 3 relocates to a different HNB 11 within the HNB-GW 15 and to report the aggregated value (including the number from the final HNB 11) to the core network 8 when the call is transferred to another HNB-GW 15 or to a macro cell, or when the call is released. As those skilled in the art will appreciate, when it is the HNBs 11 that aggregate the "Unsuccessfully Transmitted DL Data Volume", the HNB-GW 15 does not need the DL unsuccessful packet control module 88.

In the above description, the home base station 11 and the home base station gateway 15 are described, for ease of understanding, as having a number of discrete modules (base station registration modules, telephone registration modules, handover modules etc.). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

MODIFICATIONS AND ALTERNATIVES

A detailed embodiment has been described above. As those skilled in the art will appreciate, a number of modifications and alternatives can be made to the above embodiments whilst still benefiting from the inventions embodied therein.

In the above embodiments, a mobile telephone based telecommunications system was described. As those skilled in the art will appreciate, the signalling techniques described in the present application can be employed in other communications systems. Other communications nodes or devices may include user devices such as, for example, personal digital assistants, laptop computers, web browsers, etc.

In the embodiments described above, the mobile telephone and the HNB each include transceiver circuitry. Typically this circuitry will be formed by dedicated hardware circuits. However, in some embodiments, part of the transceiver circuitry may be implemented as software run by the corresponding controller.

In the above embodiments, a number of software modules were described. As those skilled in the art will appreciate, the software modules may be provided in compiled or un-compiled form and may be supplied to the HNB or to the mobile telephone as a signal over a computer network, or on a recording medium. Further, the functionality performed by part or all of this software may be performed using one or more dedicated hardware circuits. However, the use of software modules is preferred as it facilitates the updating of the base stations, gateways, and the mobile telephones in order to update their functionalities.

Whilst specific communication nodes have been described (e.g. HNB, base stations, RNC) in the description it will be appreciated that the description may apply equally to other nodes having similar functionality. In particular it will be appreciated that the term HNB is used generically to refer to home base stations of any type of network (e.g. LTE, WiMAX etc.) and that similar functionality may be provided by other similar base stations.

Various other modifications will be apparent to those skilled in the art and will not be described in further detail here.

The following is a detailed description of the way in which the present inventions may be implemented in the currently proposed 3GPP standard. Whilst various features are described as being essential or necessary, this may only be the case for the proposed 3GPP standard, for example due to other requirements imposed by the standard. These statements should not, therefore, be construed as limiting the present invention in any way.

1. INTRODUCTION

The IE "Unsuccessfully Transmitted DL Data Volume" shall be reported when the call is finally released as the charging policy may be depended on successful packet count. So the reporting of unsuccessful packet count is necessary for the CN.

This document describes few methods of reporting "Unsuccessfully Transmitted DL Data Volume" during Intra HNB-GW relocation scenario.

2. DISCUSSION

In case of Intra HNB-GW HNB-HNB relocation, IU connection towards CN is not released. Functionality of aggregating the "Unsuccessfully Transmitted DL Data Volume" shall be done at either HNB-GW or the HNB(s) involved in the relocation.

HNB-GW Based Solution:

In this case HNB-GW has to get the "Unsuccessfully Transmitted DL Data Volume" from the Source HNB(s) by some means and aggregate these values each time the UE is relocating to different HNB within the HNB-GW. In order to get this information from Source HNB, there can be following alternatives:

Alternative 1a: HNB-GW sends a RANAP IU RELEASE COMMAND message and Source HNB responds with RANAP IU RELEASE COMPLETE message including the IE "Unsuccessfully Transmitted DL Data Volume"

Proposal 1a: Source HNB sends the "Unsuccessfully Transmitted DL Data Volume" in the RANAP IU RELEASE COMPLETE message to the HNB-GW Alternative 1b: Source HNB could send include "Unsuccessfully Transmitted DL Data Volume" in the RUA DISCONNECT message to the HNB-GW Proposal 1b: Source HNB sends "Unsuccessfully Transmitted DL Data Volume" in RUA DISCONNECT message.

Alternative 1c Source HNB could send include "Unsuccessfully Transmitted DL Data Volume" in the HNBAP UE DE REGISTER message to the HNB-GW Proposal 1c: Source HNB sends "Unsuccessfully Transmitted DL Data Volume" in HNBAP UE DE-REGISTER message to the HNB-GW Alternative 1d: HNB-GW can send RUA DISCONNECT message with relevant cause such as "UE relocated". Source HNB can reply with new RUA message RUA DISCONNECT RESP, which includes "Unsuccessfully Transmitted DL Data Volume".

Proposal 1d: HNB-GW sends RUA DISCONNECT message with new cause value and Source HNB responds with new RUA message RUA DISCONNECT RESPONSE having "Unsuccessfully Transmitted DL Data Volume" as one of its IE.

Alternative 1e: HNB-GW can send HNBAP UE DE-REGISTER message to Source HNB and Source HNB can reply with HNBAP UE DE-REGISTER RESPONSE, which includes "Unsuccessfully Transmitted DL Data Volume".

Proposal 1e: HNB-GW sends HNBAP UE DE REGISTER message with new cause value and Source HNB responds new HNBAP message HNBAP UE DE-REGISTER RESPONSE having "Unsuccessfully Transmitted DL Data Volume" as one of its IE.

After reception of "Unsuccessfully Transmitted DL Data Volume" from Source HNB based on one of the above alternatives, HNB-GW shall remember this value and HNB-GW shall add each "Unsuccessfully Transmitted DL Data Volume" reported by HNBs during relocation procedures and finally use this aggregated value to send "Unsuccessfully Transmitted DL Data Volume" IE in actual IU RELEASE COMPLETE message to CN.

Proposal 2: HNB-GW shall perform the functionality of aggregation of "Unsuccessfully Transmitted DL Data Volume" reported by Source HNB(s) before sending the final IU RELEASE COMPLETE message to CN.

HNB Based Solution:

In this case, the "Unsuccessfully Transmitted DL Data Volume" is signaled to the target HNB and finally when IU release procedure happens the target HNB sends the aggregated value Unsuccessfully Transmitted DL Data Volume" to CN.

Proposal 3: Each HNB shall perform the functionality of summing up of "Unsuccessfully Transmitted DL Data Volume" reported by previous Source HNB and the "Unsuccessfully Transmitted DL Data Volume" actually resulted in current HNB.

Proposal 4: The Source HNB shall signal the "Unsuccessfully Transmitted DL Data Volume" to the Target HNB in SRNC to TRNC Container.

3. PROPOSAL

HNB-GW Based Solution:

Proposal 1a: Source HNB sends the "Unsuccessfully Transmitted DL Data Volume" in the RANAP IU RELEASE COMPLETE message to the HNB-GW Proposal 1b: Source HNB sends "Unsuccessfully Transmitted DL Data Volume" in RUA DISCONNECT message.

Proposal 1c: Source HNB sends "Unsuccessfully Transmitted DL Data Volume" in HNBAP UE DE-REGISTER message to the HNB-GW Proposal 1d: HNB-GW sends RUA DISCONNECT message with new cause value and Source HNB responds with new RUA message RUA DISCONNECT RESPONSE having "Unsuccessfully Transmitted DL Data Volume" as one of its IE.

Proposal 1e: HNB-GW sends HNBAP UE DE REGISTER message with new cause value and Source HNB responds new HNBAP message HNBAP UE DE-REGISTER RESPONSE having "Unsuccessfully Transmitted DL Data Volume" as one of its IE.

Proposal 2: HNB-GW shall perform the functionality of aggregation of "Unsuccessfully Transmitted DL Data Volume" reported by Source HNB(s) before sending the final IU RELEASE COMPLETE message to CN.

HNB Based Solution:

Proposal 3: Each HNB shall perform the functionality of summing up of "Unsuccessfully Transmitted DL Data Volume" reported by previous Source HNB and the "Unsuccessfully Transmitted DL Data Volume" actually resulted in current HNB.

Proposal 4: The Source HNB shall signal the "Unsuccessfully Transmitted DL Data Volume" to the Target HNB in SRNC to TRNC Container.

1. REFERENCE

[1] 3GPP TS 22.220, Release 9, V9.1.1, Service requirements for Home NodeBs and Home eNodeBs (Release 9)
[2] 3GPP TS 25.469, Release 8, V8.2.0, HNBAP Protocol Specification
[3] 3GPP TS 25.468, Release 8, V8.1.0
[4] 3GPP IS 25.413, Release 8, V8.3.0

This application is based upon and claims the benefit of priority from United Kingdom Patent Application No. 0914427.0, filed on Aug. 18, 2009, the disclosure of which is incorporated herein in its entirety by reference.

The invention claimed is:

1. A gateway which communicates with a plurality of home base stations, the gateway comprising:
a memory storing instructions; and
one or more processors configured to execute the instructions to:
  initiate a data volume reporting to each of the plurality of home base stations;
  receive, from the plurality of home base stations, data volume reports, wherein each of the data volume reports indicates data volume of packets that are unsuccessfully transmitted in a downlink between a home base station and a user equipment, and wherein each of the data volume reports is transmitted, from one of the plurality of home base stations to the gateway, in response to the initiated data volume reporting;
  accumulate the data volume reports received from the plurality of home base stations, respectively, thereby creating an accumulated volume report; and
  transmit the accumulated volume report to a core network node.

2. A communications control method in a gateway which communicates with a plurality of home base stations, the communications control method comprising:
- initiating a data volume reporting to each of the plurality of home base stations;
- receiving, from the plurality of home base stations, a data volume reports, wherein each of the data volume reports indicates data volume of packets that are unsuccessfully transmitted in a downlink between a home base station and a user equipment, and wherein each of the data volume reports is transmitted, from one of the plurality of home base stations to the gateway, in response to the initiated data volume reporting;
- accumulating the data volume reports from the plurality of home base stations, respectively, thereby creating an accumulated volume report; and
- transmitting the accumulated volume report to a core network node.

\* \* \* \* \*